United States Patent [19]

McMahon et al.

[11] Patent Number: 4,518,857
[45] Date of Patent: May 21, 1985

[54] TEMPERATURE AND PRESSURE COMPENSATED ELASTO-OPTIC SENSOR

[75] Inventors: Donald H. McMahon, Carlisle; William B. Spillman, Jr., Acton, both of Mass.

[73] Assignee: Sperry Corporation, New York, N.Y.

[21] Appl. No.: 473,170

[22] Filed: Mar. 7, 1983

[51] Int. Cl.³ .............................................. G02F 1/01
[52] U.S. Cl. .................................... 250/225; 367/140; 367/149; 367/174; 73/655
[58] Field of Search ....................... 73/655, 656, 657; 250/231 R, 239, 227, 225; 367/140, 141, 174, 149

[56] References Cited

U.S. PATENT DOCUMENTS

| | | | |
|---|---|---|---|
| 4,162,397 | 7/1979 | Bucaro et al. | 250/231 R |
| 4,296,318 | 10/1981 | Mezzetti et al. | 250/225 |
| 4,405,198 | 9/1983 | Taylor | 73/655 |
| 4,471,474 | 9/1984 | Fields | 73/655 |

Primary Examiner—David C. Nelms
Assistant Examiner—J. Jon Brophy
Attorney, Agent, or Firm—Howard P. Terry; Seymour Levine

[57] ABSTRACT

A pressure and temperature compensated acoustic transducer utilizing a pressure sensitive birefringent element coupled between a flexible diaphragm sealing the transducer and an internal variable rigid diaphragm that forms two internal chambers. Relatively rapid variation in pressure applied to the birefrigent element cause fluctuations in the phase difference between orthogonal components of a polarized light beam traversing the photo-elastic material. Detections of this phase difference variation provides signals representative of incident acoustic signals. Provision for the transfer of liquid filling the chambers permits the equalization between the two chambers of slowly varying internal pressures caused by changes in external ambient pressure and temperature.

10 Claims, 3 Drawing Figures

TEMPERATURE AND PRESSURE COMPENSATED ELASTO-OPTIC SENSOR

BACKGROUND OF THE INVENTION

1. Field of the Invention

The present invention relates to transducers that convert relatively rapid variations in environmental ambient conditions into intensity modulated light signals and more particularly to transducers which utilize the birefringent properties of elastooptic materials to affect this conversion.

2. Description of the Prior Art

Fiber optic transducers of the prior art generally utilize a membrane, movable with variations of the ambient condition. This membrane may be coupled to at least one of a multiplicity of optical fibers having opposing end faces across a gap, that are movable therewith to effectuate a variation of the coupling of light propagating across the gap between the end faces of optical fibers. One such device is disclosed in U.S. Pat. No. 4,300,813 issued Nov. 17, 1981 to R. L. Gravel and assigned to the assignee of the present invention. This device includes two optical fibers, each cut to have end faces substantially perpendicular to an axis and positioned with a small gap between the end faces of the fibers. One fiber mounted to maintain its end face stationary, while the other is cantilevered and coupled to a membrane movable with variations in ambient pressure, thus effectuating relative movement of the optical fibers and thereby the variation of the coefficient of coupling between the optical fibers.

A fiber optic transducer which provides improved sensitivity over that of the Gravel device is disclosed in U.S. Pat. No. 4,293,188 issued Oct. 6, 1981 to D. H. McMahon and assigned to the assignee of the present invention. As in the Gravel device, the transducer disclosed by McMahon comprises a first optical fiber disposed with its end face stationary while the second optical fiber is coupled to a membrane movable with variations in ambient pressure and disposed so that its free end may be laterally displaced from the axis of the first optical fiber in accordance with the movement of the membrane. The sensitivity of the transducer is enhanced inspite of the use of large core. Large numerical aperture, multimode optical fibers, by equipping the opposed faces of the cooperating fibers with regular arrays of equally spaced opaque, absorptive, or reflective gratings providing intensity or phase modulation of the propagating light energy in proportion to the transverse displacement of one grating with respect to the other.

Another fiber optic transducer of the prior art for converting variations in ambient pressure to intensity modulated optical signals is provided by cutting and polishing the ends of two optical fibers, having equal indices of refraction, at predetermined angles with respect to their axes and positioning the angled end faces in parallel relationship a distance apart that is less than the wavelength of the light propagating within the input fiber, creating a gap between the end faces wherein a material with a second refractive index is contained. The angled end faces are held in position by two plates, through which the fibers extend, and are coupled to pressure sensing elements of the system. Variations in pressure cause the distance between the end faces of the fibers to vary producing, via frustrated internal reflection, variations in the optical signal energy coupled between the optical fibers thus creating an amplitude modulated light beam at the output port of the system.

Though the transducers of the prior art, described above, are capable of converting motions in the order of $10^{-10}$ cm to a measurable optical signal modulation, they are susceptible to damage by vibrations or shocks of large amplitude. This damage is generally to the membranes or other moving parts of the system. Thus, it is desirable to provide fiber optic transducers to sense ambient conditions that operate without the use of relative movements between working parts to achieve a modulation of the optical power throughput.

A transducer of the prior art that is more rugged than the devices above described is disclosed in U.S. patent application No. 248,616 filed Mar. 27, 1981 by D. H. McMahon and assigned to the assignee of the present invention. This device includes an optical fiber through which light is coupled from a source to the focal region of a lens wherefrom it is collimated to be incident to a polarizer with the polarization axis oriented at 45° to the vertical. Forty-five degree polarized light is then incident to an elastooptic material such as glass, lucite, and plexiglass which become birefringent under uniaxial stress conditions. Due to the birefringence caused by a stress applied parallel to one of the axes of the elastooptic material a phase difference is realized between the vertical and horizontal components of the 45° polarized light emerging from the elasto-optic material that is proportional to the applied stress. The orthogonal components are further processed to derive signals representative of the induced phase and therefore the applied stress. This transducer, however, exhibits temperature and pressure head sensitivity, and as a consequence thereof does not provide optimum performance in ambient pressure and temperature variable environments.

SUMMARY OF THE INVENTION

In accordance with the principles of the present invention a temperature and pressure compensated elastooptic transducer for detecting acoustic signals employes a birefringent element to which ligh polarized at a predetermined angle, relative to an optical axis thereof, is incident from an optical fiber through a polarizing element. The orthogonal components of the polarized light are differentially phase shifted in the birefringent element as function of the stress applied thereto. This phase differential is detected and the applied stress is determined therefrom. The optical elements are positioned in a housing with the birefringent element coupled to a diaphragm that seals the housing. External pressures, such as those caused by acoustic signals, applied to the diaphgram are transferred to the birefringent element wherein the differential phase shift is established in accordance therewith.

Compensation for static or slowly varying pressures applied to the birefringent element caused by ambient pressure and temperature variations is realized by dividing the housing into two chambers formed by positioning a rigid plate in the housing, the edges of which are at a distance from the inner surface of the housing to establish a small gap therebetween. The optical components are positioned in one of the chambers while an evacuated fluid is inserted to fill both chambers and the gap between the inner surface of the housing and the rigid plate. Substantially static pressures applied to the birefringent element which is coupled to the diaphragm via a support column of like material, are releaved by the constant force exerted on the rigid plate that causes fluid in the second chamber to traverse the small gap into the first chamber thereby equalizing the pressure on either side of the birefringent element.

A second embodiment of the invention has the edges of the rigid plate in slide contact with the inner surface of the housing and holes in the rigid plate to permit fluid transfer for pressure equalization.

In both embodiments, compensation for relatively rapid changes of acoustic pressure are not realized and consequently are transferred to the birefringent element, wherein the orthogonal components experience relative phase shifts that vary in accordance with the variations in the applied pressure.

DESCRIPTION OF THE PREFERRED EMBODIMENTS

Figure 1:
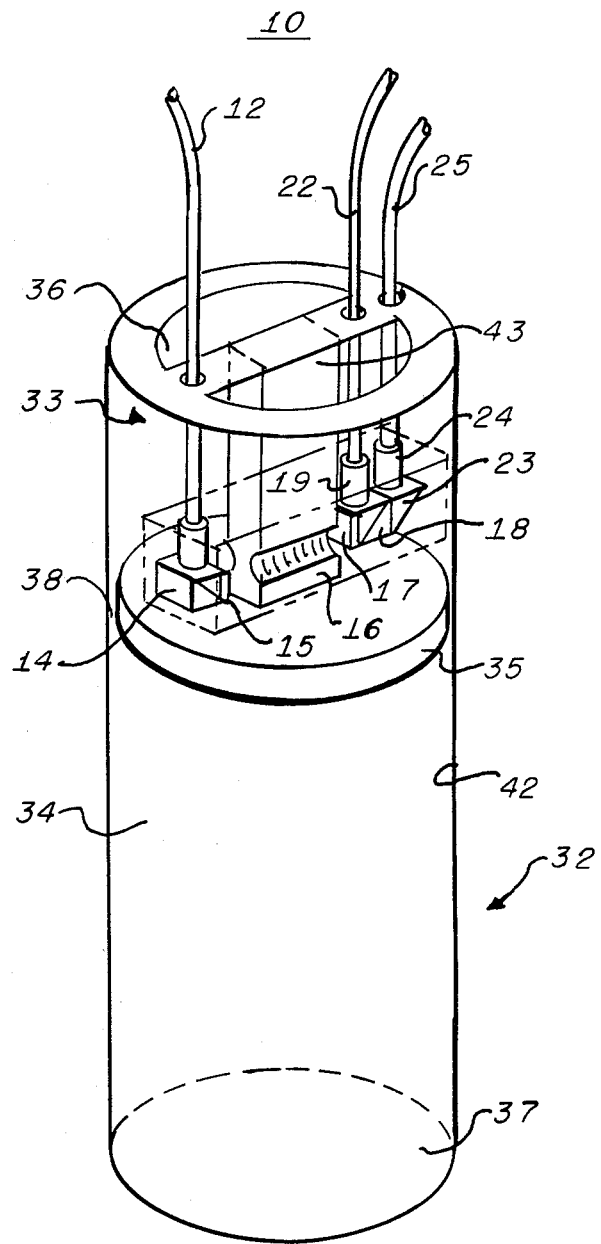
FIG. 1 is a diagrammatic illustration of an embodiment of the invention.

Referring to FIG. 1, fiber optic hydrophone 10, constructed in accordance with the principles of the present, invention may include an elasto-optic sensor 11 of the type described in U.S. patent application No. 248,616 filed on March 25, 1981 by D. H. McMahon. Briefly, unpolarized light coupled to optical fiber 12 is collimated by a lens 13, which may be of the GRINrod type, and thereafter coupled to a polarizing beam splitter 14, wherefrom linearlly polarized light is incident to a quarter wave plate (QWP) 15 having its optical axis at an angle of 45° to the polarization vector, thereby causing a circularly polarized wave to be incident to an optical channel of photoelastic material 16. Photoelastic material may be of the type known as PSM-1, which has a density of 1190 Kg/m³, a Young's modulus of 2300 MPa, Poisson ratio of 0.4, a photoelastic constant of 7 KN/fr-m, and a refractive index of 1.59.

Still referring to FIG. 1, when the photoelastic material 16 is not stressed circularly polarized light incident thereto will emerge therefrom circularly polarized. The action of a stress on this material is to create a phase differential between the polarizations respectively parallel to the vertical and horizontal axes of the photoelastic material. This phase differential caused the incident circularly polarized light to emerge as elliptically polarized light, the ellipticity being a function of the stress applied to the photoeleastic material.

The time variation of the components of the circularly polarized wave emerging from the QWP respectively parallel to the vertical and horizontal axes of the photoelastic material may be represented as:

$$A_v = \sqrt{I} \sin\left(wt + \frac{\pi}{4}\right) \quad (1)$$

$$A_H = \sqrt{I} \cos\left(wt + \frac{\pi}{4}\right)$$

I being the intensity of the light and $\sqrt{2I}$ the light wave amplitude.

These signals emerge from the photoelastic material with the relative phase difference therebetween $\phi_S = (a-b)S$, where a and b are the elasto-optic phase constants for the material and S is the thickness thereof. The emerging signals, having time dependent amplitudes that may be represented as:

$$A_v' = \sqrt{I} \sin\left(wt + \frac{\pi}{4} + \frac{\phi_s}{2}\right) \quad (2)$$

$$A_H' = \sqrt{I} \cos\left(wt + \frac{\pi}{4} - \frac{\phi_s}{2}\right)$$

are coupled to a half wave plate (HWP) 17 wherefrom signals emerge having time dependent amplitudes along the horizontal and vertical axes of $$A_v'' = \left[\sqrt{2I} \cos\left(\frac{\phi_s}{2} - \frac{\pi}{4}\right)\right] \cos wt \quad (3)$$

$$A_H'' = \left[\sqrt{2I} \sin\left(\frac{\phi_s}{2} - \frac{\pi}{4}\right)\right] \sin wt$$

These signals are incident to polarizing beam splitter 18 wherefrom the signal at the polarization component parallel to one axis of the photo-elastic material is deflected to a GRINrod lens 19 and focussed therefrom to propagate along optical fiber 22, while the signal at the polarization component parallel to the second axis of the photo-elastic material propagates through polarizing beam splitter 18 to a prism 23 for deflection to a second output optical fiber 25.

Figure 2:
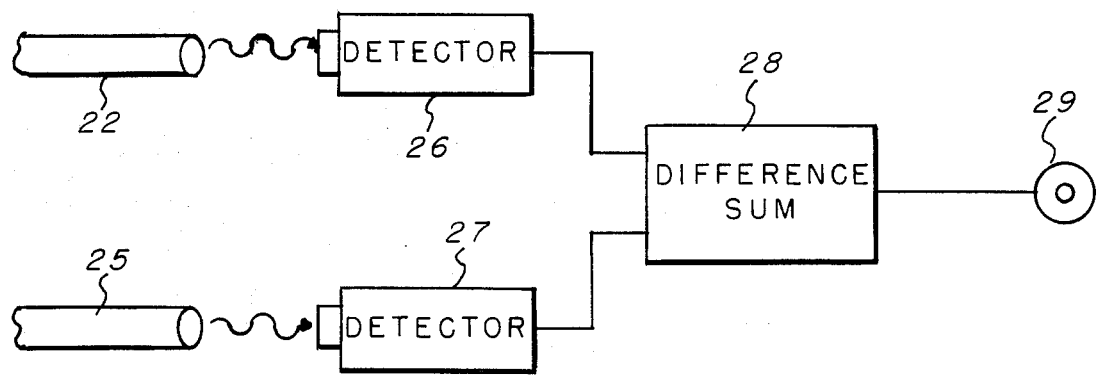
FIG. 2 is a block diagram of an optical detector useful for determining the phase differences between the optical signals at the output terminals of the invention.

Refer now to FIG. 2. The optical signals propagating along the output optical fibers 22, 25 may be coupled to photo detectors 26, 27 wherefrom signals $P_V$, $P_H$ representative of the intensity of the vertical and horizontal components given by $$P_V = I \cos^2\left(\frac{\phi_s}{2} - \frac{\pi}{4}\right) \quad (4)$$

$$P_H = I \sin^2\left(\frac{\phi_s}{2} - \frac{\pi}{4}\right)$$

are coupled to a sum and difference amplifier 28. Sum and difference amplifier 28 determines the sum and difference of the intensities and provides the ratio of the difference to the sum at an output terminal 29. This ratio given by $$D/S = \sin(a - b)S \quad (5)$$

is clearly a function of the stress applied to the elasto optic material.

Referring again to FIG. 1, fiber optic transducer 11 is positioned in the first chamber of a housing 32 which is divided into a first chamber 33 and a second chamber 34 by a rigid diaphragm 35. The housing 32 is filled with evacuated oil and sealed at the first chamber end, by a rigid plate 37. The evacuated oil fills the first chamber 33, the second chamber 34, and may flow therebetween through a gap 38 between the rigid diaphragm 35 and inner surfaces 42 of the housing 32. Photo-elastic material 16 may be cemented to the rigid diaphragm 35 and through a support column 43 coupled to the flexible diaphragm 36. Support column 43 may be of the same photoelastic material as the optical channel 16.

Acoustic forces applied to the flexible diaphragm 36 are coupled through the oil to the rigid diaphragm 35. Since the rigid diaphragm 35 can not move instantaneously, a condition is established that equalized the force of the oil in the second chamber plus a restoring force generated in the photoelastic material to the acoustic force applied to the rigid diaphragm. Utilizing the well known principle that the force applied to a given surface is equal to the pressure applied thereto times the area of the surface, it can be shown that the pressure $P_P$ on the photoelastic material is $$P_P = M(P_A - P_O) \quad (6)$$

where $P_A$ is the pressure applied to the rigid diaphragm, $P_O$ is the back pressure applied by the oil, and M is the ratio of the area of the rigid diaphragm 35 to the area of the photoelastic material 16, a ratio that is much greater than one. It is readily apparent from equation 6 that the pressure applied to the photoelastic materials 16 due to an instanteous acoustic force applied to the flexible diaphragm 36 is maximized when the oil back pressure $P_O$ is minimized.

Those skilled in the art will recognize that the back pressure generated by the oil in the second chamber and the pressure applied to the photoelastic material 16 are functions of the bulk modulus of the oil $B_O$, Young's modulus for the photoelastic material $Y_P$, the length of the second chamber $L_O$, the length of the photoelastic material $L_P$, and the compression length $\Delta L$ of the oil and the photoelastic material. These factors being related by $$P_P = \frac{\Delta L}{L_P} Y_P \quad P_O = \frac{\Delta L}{L_O} B_O \quad (7)$$

Thus, it is readily seen that the oil back pressure may be reduced with the lengthening of the second chamber 34. Consequently, the second chamber 34 is of a length that is very much longer than the length of the first chamber 33. Since it is not possible to eliminate the oil back pressure, a loss of sensitivity U, the ratio of the distributed pressure across the photoelastic material 16 to the total applied pressure, given by equation 8 is realized.

$$U = \frac{P_P/M}{P_P/M + P_O} = \frac{1}{1 + \frac{B_O L_P M}{Y_P L_O}} \quad (8)$$

The apparatus as shown in FIG. 1 automatically compensates variations in ambient temperature and pressure. Since the support column 43 is made of the same material as the photoelastic material 16 in the active region of the transducer it expands as a function of applied pressure and temperature in the same manner as the material in the active region of the transducer 11. Thus, applied stress due to ambient conditions is due primarily to the forces exerted on the photoelastic material by the rigid diaphragm 35. Static pressure applied to the flexible diaphragm 36 or pressures induced in the apparatus due to ambient temperatures cause the oil in the second chamber to seep through the gap 38 which may be in order of 4 to 5 mills into the first chamber causing the flexible diaphragm 36 to flex thereby relieving the pressure on a rigid diaphragm 35 and concomitantly the pressure applied to photoelastic material 16. The width of the gap 38 and the viscosity of the oil in the first and second chambers are such that the pressure relieving mechanism above described does not respond to pressure variations at acoustic frequencies. In this manner an acoustic hydrophone, insensitive to ambient pressure and temperature is realized.

Figure 3:
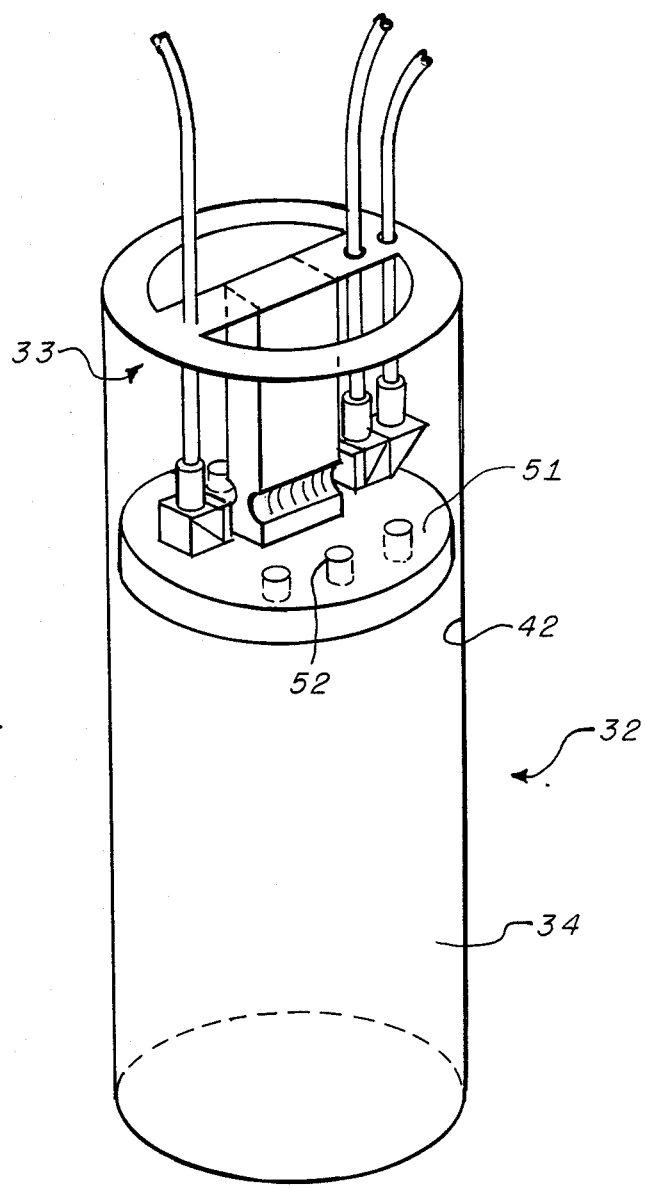
FIG. 3 is a diagrammatic illustration of a second embodiment of the invention.

Refer now to FIG. 3 wherein a rigid diaphragm 51 of the dimensions to establish a slide fit along inner surfaces 42 of the housing 32 is shown. One or more small holes 52 may be bored through the rigid diaphragm 51 to allow for the transfer of oil between the first and second chambers 33 and 34. The operation of this device is as described above with the ambient pressure and temperature compensation being accomplished by a transfer of oil between the first and second chambers 33, 34 through the holes 52.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for sensing acoustic signals of the type having a transducer which includes input and output optical fibers, light polarizers, and components in cooperation with a birefringent element having pressure sensitive birefringent properties for measuring differential phase of optical signals, further comprising:
    a housing having closed and open ends;
    means for sealing said housing and for transferring pressure variations caused by incident acoustic signals to said birefringent element; and
    rigid diaphragm means coupled to said birefringent element and located in said housing to form a first chamber wherein said transducer is positioned, and a second chamber, said rigid means being movable for neutralizing pressure applied to said diaphragm and birefringent elements.

2. An apparatus in accordance with claim 1 wherein said sealing and pressure transferring means includes a flexible diaphragm that scals said housing at and of said first chamber and is coupled to said birefringent element.

3. An apparatus in accordance with claim 2 wherein said first and second chambers are substantially fluid filled.

4. An apparatus in accordance with claim 3 further including means for transferring said fluid between said first and second chambers in response to substantially static pressures applied to said rigid diaphragm.

5. An apparatus in accordance with claim 4 wherein said transfer means includes said rigid diaphragm with dimensions smaller than inner surface dimensions of said housing so that a passage for fluid to flow between said first and second chambers is formed by edges of said rigid diaphragm and said inner surfaces.

6. An apparatus in accordance with claim 5 wherein said birefringent element is coupled to said flexible diaphragm through a support column made of a material substantially similiar to material comprising said birefringent element.

7. An apparatus in accordance with claim 4 wherein said transfer means includes said rigid diaphragm with dimensions to provide a slide fit between edges thereof and inner surfaces of said housing, said rigid diaphragm having at least one hole therein for passage of said fluid between said first and second chambers.

8. An apparatus in accordance with claim 7 wherein said birefringent element is coupled to said flexible diaphragm via a support column made of material substantially similar to material comprising said birefringent element.

9. An apparatus in accordance with claim 8 wherein said first and second chambers have lengths $L_1$ and $L_2$ respectively, $L_2$ being longer than $L_1$.

10. An apparatus in accordance with claim 9 wherein said rigid diaphragm and said birefringent elements have cross sectional areas in planes parallel to said open end of said housing of $A_1$ and $A_2$ respectively, where $A_1$ is greater than $A_2$.

* * * * *